United States Patent

Chapman et al.

[11] Patent Number: 6,124,237
[45] Date of Patent: Sep. 26, 2000

[54] ORANGE DYE MIXTURE FOR THERMAL COLOR PROOFING

[75] Inventors: Derek D. Chapman, Rochester; Linda A. Kaszczuk, Webster; Mark A. Harris, Rochester, all of N.Y.

[73] Assignee: Eastman Kodak Company, Rochester, N.Y.

[21] Appl. No.: 09/417,790

[22] Filed: Oct. 14, 1999

[51] Int. Cl.[7] .............................. B41M 5/035; B41M 5/38
[52] U.S. Cl. ......................... 503/227; 428/195; 428/913; 428/914
[58] Field of Search ............................... 8/471; 428/195, 428/913, 914; 503/227

[56] References Cited

U.S. PATENT DOCUMENTS

| | | | |
|---|---|---|---|
| 4,757,046 | 7/1988 | Byers et al. | 503/227 |
| 5,866,509 | 2/1999 | Chapman et al. | 503/227 |

FOREIGN PATENT DOCUMENTS

| | | |
|---|---|---|
| 52099379 | 8/1977 | Japan . |
| 53014734 | 2/1978 | Japan . |

*Primary Examiner*—Bruce H. Hess
*Attorney, Agent, or Firm*—Harold E. Cole

[57] ABSTRACT

An orange dye-donor element for thermal dye transfer comprising a support having thereon a dye layer comprising a mixture of a pink dye and a first and second yellow dye dispersed in a polymeric binder, said pink dye having the formula A:

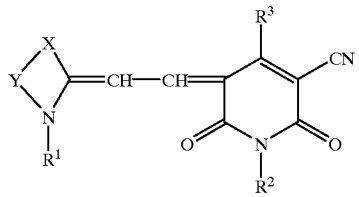

A said first yellow dye having the formula E having the structure:

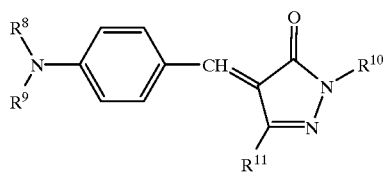

E said second yellow dye having the formula F or G, said formula F having the structure:

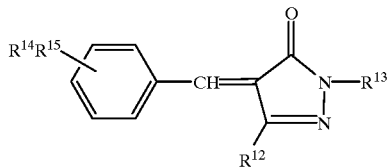

F said formula G having the structure:

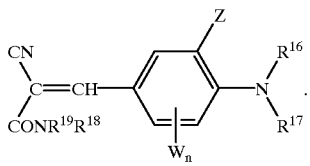

G

19 Claims, No Drawings

ORANGE DYE MIXTURE FOR THERMAL COLOR PROOFING

CROSS REFERENCE TO RELATED APPLICATIONS

Reference is made to commonly-assigned copending U.S. patent application Ser. No. 09/418,287, filed Oct. 14, 1999, entitled "Orange Dye Mixture for Thermal Color Proofing", of Chapman et al.;

Copending U.S. patent application Ser. No. 09/418,339, filed Oct. 14, 1999, entitled "Orange Dye Mixture for Thermal Color Proofing", of Chapman et al.;

Copending U.S. patent application Ser. No. 09/418,234, filed Oct. 14, 1999, entitled "Orange Dye Mixture for Thermal Color Proofing", of Chapman et al.; and Copending U.S. patent application Ser. No. 09/418,233, filed Oct. 14, 1999, entitled "Pink Dye for Thermal Color Proofing", of Chapman et al.

FIELD OF THE INVENTION

This invention relates to use of a mixture of dyes for thermal dye transfer imaging which is used to obtain a color proof that accurately represents the hue of a printed color image obtained from a printing press.

BACKGROUND OF THE INVENTION

In order to approximate the appearance of continuous-tone (photographic) images via ink-on-paper printing, the commercial printing industry relies on a process known as halftone printing. In halftone printing, color density gradations are produced by printing patterns of dots or areas of varying sizes, but of the same color density, instead of varying the color density continuously as is done in photographic printing.

There is an important commercial need to obtain a color proof image before a printing press run is made. It is desired that the color proof will accurately represent at least the details and color tone scale of the prints obtained on the printing press. In many cases, it is also desirable that the color proof accurately represent the image quality and halftone pattern of the prints obtained on the printing press. In the sequence of operations necessary to produce an ink-printed, full-color picture, a proof is also required to check the accuracy of the color separation data from which the final three or more printing plates or cylinders are made. Traditionally, such color separation proofs have involved silver halide photographic, high-contrast lithographic systems or non-silver halide light-sensitive systems which require many exposure and processing steps before a final, full-color picture is assembled.

Colorants that are used in the printing industry are insoluble pigments. By virtue of their pigment character, the spectrophotometric curves of the printing inks are often unusually sharp on either the bathochromic or hypsochromic side. This can cause problems in color proofing systems in which dyes, as opposed to pigments, are being used. It is very difficult to match the hue of a given ink using a single dye.

In U.S. Pat. No. 5,126,760, a process is described for producing a direct digital, halftone color proof of an original image on a dye-receiving element. The proof can then be used to represent a printed color image obtained from a printing press. The process described therein comprises:

a) generating a set of electrical signals which is representative of the shape and color scale of an original image;

b) contacting a dye-donor element comprising a support having thereon a dye layer and an infrared-absorbing material with a first dye-receiving element comprising a support having thereon a polymeric, dye image-receiving layer;

c) using the signals to imagewise-heat by means of a diode laser the dye-donor element, thereby transferring a dye image to the first dye-receiving element; and d) retransferring the dye image to a second dye image-receiving element which has the same substrate as the printed color image.

In the above process, multiple dye-donors are used to obtain a complete range of colors in the proof. For example, for a full-color proof, four colors: cyan, magenta, yellow and black are normally used.

By using the above process, the image dye is transferred by heating the dye-donor containing the infrared-absorbing material with the diode laser to volatilize the dye, the diode laser beam being modulated by the set of signals which is representative of the shape and color of the original image, so that the dye is heated to cause volatilization only in those areas in which its presence is required on the dye-receiving layer to reconstruct the original image.

Similarly, a thermal transfer proof can be generated by using a thermal head in place of a diode laser as described in U.S. Pat. No. 4,923,846. Commonly available thermal heads are not capable of generating halftone images of adequate resolution but can produce high quality continuous tone proof images which are satisfactory in many instances. U.S. Pat. No. 4,923,846 also discloses the choice of mixtures of dyes for use in thermal imaging proofing systems. The dyes are selected on the basis of values for hue error and turbidity. The Graphic Arts Technical Foundation Research Report No. 38, "Color Material" (58-(5) 293–301, 1985) gives an account of this method.

An alternative and more precise method for color measurement and analysis uses the concept of uniform color space known as CIELAB in which a sample is analyzed mathematically in terms of its spectrophotometric curve, the nature of the illuminant under which it is viewed and the color vision of a standard observer. For a discussion of CIELAB and color measurement, see *Principles of Color Technology*, 2nd Edition, F. W. Billmeyer, p. 25–110, Wiley-Interscience and *Optical Radiation Measurements*, Volume 2, F. Grum, p. 33–145, Academic Press.

In using CIELAB, colors can be expressed in terms of three parameters: $L^*$, $a^*$ and $b^*$, where $L^*$ is a lightness function, and $a^*$ and $b^*$ define a point in color space. Thus, a plot of $a^*$ vs. $b^*$ values for a color sample can be used to accurately show where that sample lies in color space, i.e., what its hue is. This allows different samples to be compared for hue if they have similar density and $L^*$ values.

In color proofing in the printing industry, it is important to be able to match the printing inks. For additional information on color measurement of inks for web offset proofing, see "Advances in Printing Science and Technology", Proceedings of the 19th International Conference of Printing Research Institutes, Eisenstadt, Austria, June 1987, J. T. Ling and R. Warner, p.55.

JP 53/014734 and JP 52/099379 disclose indoline dyes for dyeing polyester fibers. However, there is no disclosure in these references that these dyes may be used in thermal dye transfer.

U.S. Pat. No. 5,866,509 discloses a magenta dye-donor element comprising a mixture of magenta dyes and a small amount of yellow dye for color proofing. However, there is no disclosure in this reference of how to make an orange dye-donor element.

U.S. Pat. No. 4,757,046 discloses a merocyanine dye-donor element used in thermal dye transfer. However, there is no disclosure in this reference of how to make an orange dye-donor element.

It is an object of this invention to provide an orange dye donor element comprising a mixture of a pink and yellow dyes for color proofing which will match an orange, pigmented printing ink.

SUMMARY OF THE INVENTION

This and other objects are obtained by this invention which relates to an orange dye-donor element for thermal dye transfer comprising a support having thereon a dye layer comprising a mixture of a pink dye and a first and second yellow dye dispersed in a polymeric binder, said pink dye having the formula A:

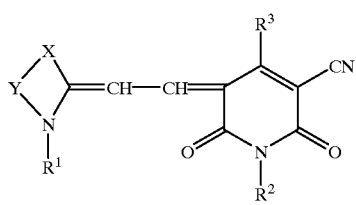

A wherein:
$R^1$, $R^2$ and $R^3$ each independently represents a substituted or unsubstituted alkyl group having from 1 to about 10 carbon atoms; a substituted or unsubstituted cycloalkyl group having from about 5 to about 7 carbon atoms; a substituted or unsubstituted allyl group, such as cinnamyl or methallyl; a substituted or unsubstituted aryl group of from about 6 to about 10 carbon atoms, such as phenyl, naphthyl, p-tolyl, m-chlorophenyl, p-methoxyphenyl, m-bromophenyl, o-tolyl, etc; or a substituted or unsubstituted hetaryl group of from about 5 to about 10 atoms, such as 2-thienyl, 2-pyridyl or 2-furyl;

X represents $C(CH_3)_2$, S, O or $NR_1$; and

Y represents the atoms necessary to complete a 5- or 6-membered ring which may be fused to another ring system;

said first yellow dye having the formula E having the structure:

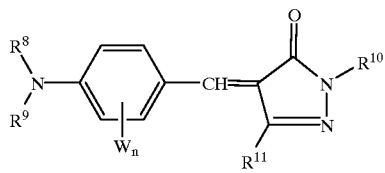

E wherein:
$R^8$, $R^9$ and $R^{10}$ each independently represents a substituted or unsubstituted alkyl group of from 1 to about 10 carbon atom; a cycloalkyl group of from about 5 to about 7 carbon atoms; or a substituted or unsubstituted aryl group of from about 6 to about 10 carbon atoms, such as phenyl, naphthyl, p-tolyl, m-chlorophenyl, p-methoxyphenyl, m-bromophenyl, o-tolyl, etc.;

or $R^8$ and $R^9$ can be joined together to form, along with the nitrogen to which they are attached, a 5-or 6-membered heterocyclic ring, such as a pyrrolidine or morpholine ring;

or either or both of $R^8$ and $R^9$ can be joined to the carbon atom of the benzene ring at a position ortho to the position of attachment of the anilino nitrogen to form a 5- or 6-membered ring, thus forming a polycyclic system such as 1,2,3,4-tetrahydroquinoline, julolidine, 2,3-dihydroindole, or benzomorpholine;

$R^{11}$ represents a substituted or unsubstituted alkoxy group having from 1 to about 10 carbon atoms, such as methoxy, ethoxy, methoxyethoxy or 2-cyanoethoxy; a substituted or unsubstituted aryloxy group having from about 6 to about 10 carbon atoms, such as phenoxy, m-chlorophenoxy, or naphthoxy; $NHR^8$; $NR^8R^9$;

each W independently represents a substituted or unsubstituted alkyl group having from 1 to about 10 carbon atoms; alkoxy having from 1 to about 10 carbon atoms; halogen; or two adjacent W's together represent the atoms necessary to complete a 5- or 6-membered ring, thus forming a fused ring system; and n represents an integer from 0 to 2.

said second yellow dye having the formula F or G, said formula F having the structure:

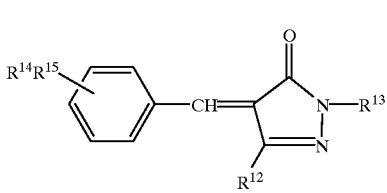

F wherein:
$R^{12}$ represents methyl or a substituted or unsubstituted alkoxy group having from 1 to about 10 carbon atoms, such as methoxy, ethoxy, methoxyethoxy or 2-cyanoethoxy; a substituted or unsubstituted aryloxy group having from about 6 to about 10 carbon atoms such as phenoxy, m-chlorophenoxy or naphthoxy;

$R^{13}$ represents a substituted or unsubstituted alkyl group of from 1 to about 10 carbon atoms; a cycloalkyl group of from about 5 to about 7 carbon atoms; or a substituted or unsubstituted aryl group of from about 6 to about 10 carbon atoms;

$R^{14}$ and $R^{15}$ each independently represents hydrogen or a substituted or unsubstituted alkyl or alkoxy group having from 1 to about 4 carbon atoms; and said formula G having the structure:

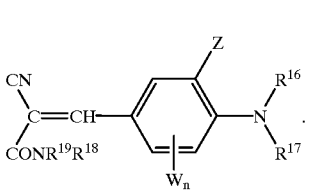

G wherein:
$R^{17}$, $R^{18}$ and $R^{19}$ each independently represents the same groups as $R^1$, $R^2$ and $R^3$ above;

$R^{16}$ represents any of the groups for $R^{17}$, $R^{18}$ and $R^{19}$ or represents the atoms which when taken together with Z forms a 5- or 6-membered ring;

Z represents hydrogen; a substituted or unsubstituted alkyl group having from 1 to about 10 carbon atoms; alkoxy; halogen; or represents the atoms which when taken together with $R^{16}$ forms a 5- or 6-membered ring;

each W independently represents a substituted or unsubstituted alkyl group having from 1 to about 10 carbon atoms; alkoxy having from 1 to about 10 carbon atoms; halogen; or two adjacent W's together represent the atoms necessary to complete a 5- or 6-membered ring, thus forming a fused ring system; and n represents an integer from 0 to 2.

Another embodiment of the invention relates to a process of forming an orange dye transfer image comprising imagewise-heating an orange dye-donor element comprising a support having thereon a dye layer comprising a mixture of dyes dispersed in a polymeric binder, and transferring a dye image to a dye-receiving element to form the orange dye transfer image, the orange dye-donor element comprising a support having thereon a dye layer comprising a mixture of a pink dye and at least one yellow dye dispersed in a polymeric binder, the pink dye having the formula A as described above and the at least one yellow dye being chosen such that a solid area orange dye transfer image has a hue angle in CIELAB color space of from about 40 to about 70 degrees.

DETAILED DESCRIPTION OF THE INVENTION

Useful pink dyes within the scope of the invention include the following:

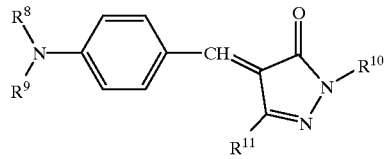

| Dye | $R^1$ | $R^2$ | $R^3$ | X |
|---|---|---|---|---|
| A1 | $C_2H_5$ | $CH_2CH_3$ | $CH_3$ | S |
| A2 | $C_3H_7$ | $C_4H_9$ | $C_2H_5$ | $C(CH_3)_2$ |
| A3 | $C_4H_9$ | $C_2H_4OCH_3$ | $CH_3$ | $C(CH_3)_2$ |
| A4 | $C_4H_9$ | $C_4H_9$ | $C_2H_5$ | $C(CH_3)_2$ |
| A5 | $C_2H_5$ | $C_2H_4OC_2H_5$ | $CH_3$ | $C(CH_3)_2$ |
| A6 | $CH_3$ | $CH_2C_6H_5$ | $CH_3$ | $C(CH_3)_2$ |
| A7 | $CH_3$ | $CH_2C_6H_5$ | $CH_3$ | S |

The above dyes and synthetic procedures for making them are disclosed in JP 53/014734, the disclosure of which is hereby incorporated by reference. In a preferred embodiment of the invention, $R^1$ is butyl, $R^2$ is 2-methoxyethyl, $R^3$ is methyl, X represents $C(CH_3)_2$ and Y is a 6-membered aromatic ring.

As noted above, the yellow dye or dyes useful in the invention is chosen such that a solid area orange dye transfer image has a hue angle in CIELAB color space of from about 40 to about 70 degrees. Examples of such yellow dyes include those described in U.S. Pat. Nos. 5,037,799 and 5,045,524 and those disclosed in the above-referenced U.S. patent application Ser. Nos. 09/418,234, 09/418,339, and 09/417,790, 09/418,287, Docket 79887HEC the disclosures of which are hereby incorporated by reference.

In a preferred embodiment of the invention, a mixture of yellow dyes is employed wherein the first yellow dye has the above formula E and a second yellow dye is employed which has the formula F or G.

Useful yellow dyes within the scope of formula E include:

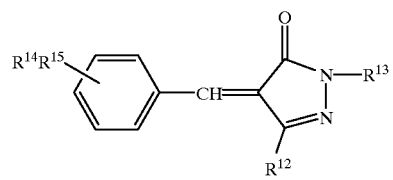

| Dye | $R^8$ | $R^9$ | $R^{10}$ | $R^{11}$ |
|---|---|---|---|---|
| E1 | $C_2H_5$ | $C_2H_5$ | $C_6H_5$ | $OC_2H_5$ |
| E2 | $C_2H_5$ | $C_2H_5$ | $C_6H_5$ | $N(CH_3)_2$ |
| E3 | $CH_3$ | $CH_3$ | $C_6H_5$ | $N(CH_3)_2$ |
| E4 | $CH_2C_6H_5$ | $CH_3$ | $C_6H_5$ | $OC_2H_5$ |

The above dyes and synthetic procedures for making them are disclosed in U.S. Pat. No. 4,866,029, the disclosure of which is hereby incorporated by reference. In a preferred embodiment of the invention, $R^8$ and $R^9$ are each ethyl, $R^{10}$ is phenyl and $R^{11}$ is dimethylamino.

Useful yellow dyes within the scope of formula F include:

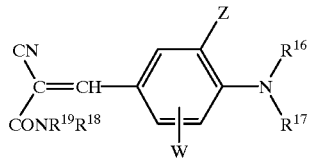

| Dye | $R^{14}$ | $R^{15}$ | $R^{12}$ | $R^{13}$ |
|---|---|---|---|---|
| F1 | 3-$CH_3O$ | 4-$CH_3O$ | $CH_3$ | $C_6H_5$ |
| F2 | 3-$CH_3O$ | H | $CH_3$ | $C_6H_5$ |
| F3 | H | 4-$CH_3O$ | $CH_3$ | $C_6H_5$ |
| F4 | $CH_3$ | 4-$CH_3O$ | $CH_3$ | $C_6H_5$ |
| F5 | $CH_3$ | $CH_3$ | $CH_3$ | $C_6H_5$ |
| F6 | $CH_3$ | $CH_3$ | $CH_3O$ | $C_6H_5$ |
| F7 | $CH_3$ | $CH_3$ | $CH_3O$ | $C_6H_5$ |
| F8 | H | 4-$CH_3O$ | $CH_3O$ | $C_6H_5$ |

The above dyes are disclosed in U.S. Pat. No. 5,866,509, the disclosure of which is hereby incorporated by reference. In a preferred embodiment of the invention, $R^{13}$ is phenyl, $R^{12}$ is methyl, $R^{14}$ is 3-methoxy and $R^{15}$ is 4-methoxy.

Useful yellow dyes within the scope of formula G include:

| Dye | $R^{17}$ | $R^{16}$ | $R^{19}$ | $R^{18}$ | W |
|---|---|---|---|---|---|
| G1 | $CH_3$ | $CH_3$ | $C_2H_5$ | H | H |
| G2 | $C_2H_5$ | $C_2H_5$ | H | $C_3H_7$ | H |
| G3 | $C_2H_5$ | $C_2H_5$ | $CH_2C_6H_5$ | H | H |
| G4 | $C_2H_5$ | $CH_2C_6H_5$ | $CH_2C_6H_5$ | H | H |
| G5 | $CH_3$ | $C_4H_9$ | $C_6H_5$ | $CH_3$ | 2-$CH_3$ |
| G6 | $C_4H_9$ | $C_4H_9$ | $C_3H_7$ | $C_3H_7$ | H |

-continued

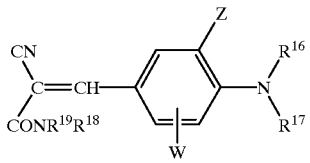

| Dye | $R^{17}$ | $R^{16}$ | $R^{19}$ | $R^{18}$ | W |
|-----|----------|----------|----------|----------|---|
| G7  | $CH_3$   | $CH_3$   | $CH_2Ph$ | $CH_3$   | 2-$CH_3$ |

The above dyes are disclosed in U.S. Pat. No. 5,081,101, the disclosure of which is hereby incorporated by reference. In a preferred embodiment of the invention, $R^{16}$ is benzyl, $R^{17}$ is ethyl, $R^{18}$ is hydrogen, $R^{19}$ is benzyl, Z is hydrogen and n is 0.

The use of dye mixtures in the dye-donor of the invention permits a wide selection of hue and color that enables a closer hue match to a variety of printing inks to be achieved and also permits easy transfer of images to a receiver one or more times if desired. The use of dyes also allows easy modification of image density to any desired level. The dyes of the dye-donor element of the invention may be used at a coverage of from about 0.02 to about 1 g/m².

The dyes in the dye-donor of the invention are dispersed in a polymeric binder such as a cellulose derivative, e.g., cellulose acetate hydrogen phthalate, cellulose acetate, cellulose acetate propionate, cellulose acetate butyrate, cellulose triacetate or any of the materials described in U.S. Pat. No. 4,700,207; a polycarbonate; poly(vinyl acetate); poly (styrene-co-acrylonitrile); a polysulfone or a poly(phenylene oxide). The binder may be used at a coverage of from about 0.1 to about 5 g/m².

The dye layer of the dye-donor element may be coated on the support or printed thereon by a printing technique such as a gravure process.

Any material can be used as the support for the dye-donor element of the invention provided it is dimensionally stable and can withstand the heat of the laser or thermal head. Such materials include polyesters such as poly(ethylene terephthalate); polyamides; polycarbonates; cellulose esters such as cellulose acetate; fluorine polymers such as poly (vinylidene fluoride) or poly(tetrafluoroethylene-co-hexafluoropropylene); polyethers such as polyoxymethylene; polyacetals; polyolefins such as polystyrene, polyethylene, polypropylene or methylpentene polymers; and polyimides such as polyimide-amides and polyether-imides. The support generally has a thickness of from about 5 to about 200 μm. It may also be coated with a subbing layer, if desired, such as those materials described in U.S. Pat. No. 4,695,288 or 4,737,486.

The reverse side of the dye-donor element may be coated with a slipping layer to prevent the printing head from sticking to the dye-donor element. Such a slipping layer would comprise either a solid or liquid lubricating material or mixtures thereof, with or without a polymeric binder or a surface-active agent. Preferred lubricating materials include oils or semicrystalline organic solids that melt below 100° C. such as poly(vinyl stearate), beeswax, perfluorinated alkyl ester polyethers, polycaprolactone, silicone oil, polytetrafluoroethylene, carbowax, poly(ethylene glycols), or any of those materials disclosed in U.S. Pat. Nos. 4,717, 711; 4,717,712; 4,737,485; and 4,738,950. Suitable polymeric binders for the slipping layer include poly(vinyl alcohol-co-butyral), poly(vinyl alcohol-co-acetal), polystyrene, poly(vinyl acetate), cellulose acetate butyrate, cellulose acetate propionate, cellulose acetate or ethyl cellulose.

The amount of the lubricating material to be used in the slipping layer depends largely on the type of lubricating material, but is generally in the range of about 0.001 to about 2 g/m². If a polymeric binder is employed, the lubricating material is present in the range of 0.1 to 50 weight %, preferably 0.5 to 40%, of the polymeric binder employed.

The dye-receiving element that is used with the dye-donor element of the invention usually comprises a support having thereon a dye image-receiving layer. The support may be a transparent film such as a poly(ether sulfone), a polyimide, a cellulose ester such as cellulose acetate, a poly(vinyl alcohol-co-acetal) or a poly(ethylene terephthalate). The support for the dye-receiving element may also be reflective such as baryta-coated paper, polyethylene-coated paper, an ivory paper, a condenser paper or a synthetic paper such as DuPont Tyvek®. Pigmented supports such as white polyester (transparent polyester with white pigment incorporated therein) may also be used.

The dye image-receiving layer may comprise, for example, a polycarbonate, a polyurethane, a polyester, poly (vinyl chloride), poly(styrene-co-acrylonitrile), polycaprolactone, a poly(vinyl acetal) such as poly(vinyl alcohol-co-butyral), poly(vinyl alcohol-co-benzal), poly (vinyl alcohol-co-acetal) or mixtures thereof. The dye image-receiving layer may be present in any amount which is effective for the intended purpose. In general, good results have been obtained at a concentration of from about 1 to about 5 g/m².

As noted above, the dye-donor elements of the invention are used to form a dye transfer image. Such a process comprises imagewise-heating a dye-donor element as described above and transferring a dye image to a dye-receiving element to form the dye transfer image.

The dye-donor element of the invention may be used in sheet form or in a continuous roll or ribbon. If a continuous roll or ribbon is employed, it may have only the dyes thereon as described above or may have alternating areas of other different dyes or combinations, such as sublimable cyan and/or yellow and/or black or other dyes. Such dyes are disclosed in U.S. Pat. No. 4,541,830, the disclosure of which is hereby incorporated by reference. Thus, one-, two-, three- or four-color elements (or higher numbers also) are included within the scope of the invention.

Thermal printing heads which can be used to transfer dye from the dye-donor elements of the invention are available commercially. There can be employed, for example, a Fujitsu Thermal Head (FTP-040 MCS001), a TDK Thermal Head F415 HH7-1089 or a Rohm Thermal Head KE 2008-F3.

A laser may also be used to transfer dye from the dye-donor elements of the invention. When a laser is used, it is preferred to use a diode laser since it offers substantial advantages in terms of its small size, low cost, stability, reliability, ruggedness, and ease of modulation. In practice, before any laser can be used to heat a dye-donor element, the element must contain an absorbing material which absorbs at the emitting wavelength of the laser. When an infrared laser is employed, then an infrared-absorbing material may be used, such as carbon black, cyanine infrared-absorbing dyes as described in U.S. Pat. No. 4,973,572, or other materials as described in the following U.S. Pat. Nos. 4,948,777; 4,950,640; 4,950,639; 4,948,776; 4,948,778;

4,942,141; 4,952,552; 5,036,040; and 4,912,083, the disclosures of which are hereby incorporated by reference. The laser radiation is then absorbed into the dye layer and converted to heat by a molecular process known as internal conversion. Thus, the construction of a useful dye layer will depend not only on the hue, transferability and intensity of the image dyes, but also on the ability of the dye layer to absorb the radiation and convert it to heat.

Lasers which can be used to transfer dye from dye-donors employed in the invention are available commercially. There can be employed, for example, Laser Model SDL-2420-H2 from Spectra Diode Labs, or Laser Model SLD 304 V/W from Sony Corp.

A thermal printer which uses the laser described above to form an image on a thermal print medium is described and claimed in U.S. Pat. No. 5,268,708, the disclosure of which is hereby incorporated by reference.

Spacer beads may be employed in a separate layer over the dye layer of the dye-donor in the above-described laser process in order to separate the dye-donor from the dye-receiver during dye transfer, thereby increasing the uniformity and density of the transferred image. That invention is more fully described in U.S. Pat. No. 4,772,582, the disclosure of which is hereby incorporated by reference. Alternatively, the spacer beads may be employed in the receiving layer of the dye-receiver as described in U.S. Pat. No. 4,876,235, the disclosure of which is hereby incorporated by reference. The spacer beads may be coated with a polymeric binder if desired.

The use of an intermediate receiver with subsequent retransfer to a second receiving element may also be employed in the invention. A multitude of different substrates can be used to prepare the color proof (the second receiver) which is preferably the same substrate as that used for the printing press run. Thus, this one intermediate receiver can be optimized for efficient dye uptake without dye-smearing or crystallization.

Examples of substrates which may be used for the second receiving element (color proof) include the following: Flo Kote Cover® (S. D. Warren Co.), Champion Textweb® (Champion Paper Co.), Quintessence Gloss® (Potlatch Inc.), Vintage Gloss® (Potlatch Inc.), Khrome Kote® (Champion Paper Co.), Consolith Gloss® (Consolidated Papers Co.), Ad-Proof Paper® (Appleton Papers, Inc.) and Mountie Matte® (Potlatch Inc.).

As noted above, after the dye image is obtained on a first dye-receiving element, it may be retransferred to a second dye image-receiving element. This can be accomplished, for example, by passing the two receivers between a pair of heated rollers. Other methods of retransferring the dye image could also be used such as using a heated platen, use of pressure and heat, external heating, etc.

Also as noted above, in making a color proof, a set of electrical signals is generated which is representative of the shape and color of an original image. This can be done, for example, by scanning an original image, filtering the image to separate it into the desired additive primary colors, i.e., red, blue and green, and then converting the light energy into electrical energy. The electrical signals are then modified by computer to form the color separation data which are used to form a halftone color proof. Instead of scanning an original object to obtain the electrical signals, the signals may also be generated by computer. This process is described more fully in *Graphic Arts Manual*, Janet Field ed., Arno Press, New York 1980 (p. 358ff), the disclosure of which is hereby incorporated by reference.

A thermal dye transfer assemblage of the invention comprises a) a dye-donor element as described above, and b) a dye-receiving element as described above, the dye-receiving element being in a superposed relationship with the dye-donor element so that the dye layer of the donor element is in contact with the dye image-receiving layer of the receiving element.

The above assemblage comprising these two elements may be preassembled as an integral unit when a monochrome image is to be obtained. This may be done by temporarily adhering the two elements together at their margins. After transfer, the dye-receiving element is then peeled apart to reveal the dye transfer image.

The following example is provided to illustrate the invention.

EXAMPLE

Dye-Donor Element 1

On a 100 μm poly(ethylene terephthalate) support was coated a dye layer containing pink dye A3 illustrated above (0.156 g/m$^2$), yellow dye E2 illustrated above (0.111 g/m$^2$), yellow dye F1 illustrated above (0.067 g/m$^2$), the cyanine infrared-absorbing dye disclosed in U.S. Pat. No. 5,024,990 (column 13, lines 1–15) at 0.041 g/m$^2$ in a cellulose acetate binder (CAP 480-20 from Eastman Chemical Company) (0.41 g/m$^2$) from a solvent mixture of methyl isobutyl ketone and ethyl alcohol (70/30 wt./wt).

Dye-Donor Element 2

On a 100 μm poly(ethylene terephthalate) support was coated a dye layer containing pink dye A3 illustrated above (0.168 g/m$^2$), yellow dye E2 illustrated above (0.087 g/m$^2$), yellow dye G4 illustrated above (0.131 g/m$^2$), the cyanine infrared-absorbing dye disclosed in U.S. Pat. No. 5,024,990 (column 13, lines 1–15) at 0.041 g/m$^2$ in a cellulose acetate binder (CAP 480-20 from Eastman Chemical Company) (0.41 g/m$^2$) from a solvent mixture of methyl isobutyl ketone and ethyl alcohol (70/30 wt./wt).

Control Orange Ink

A sample of orange ink manufactured by the Flint Ink Corporation drawn down on paper was used as a reference material and its CIELAB color coordinates measured at a status T density of 1.49. This ink is representative of an orange pigmented ink used in offset printing.

Printing

An intermediate dye-receiving element, Kodak APPROVAL®. Intermediate Color Proofing Film, CAT # 831 5582, was used with the above dye-donor elements to print an image. The power to the laser array was modulated to produce a continuous tone image consisting of uniform "steps" of varying density as described in U.S. Pat. No. 4,876,235. After the laser array had finished scanning the image area, the laser exposure device was stopped and the intermediate receiver containing the transferred image was laminated to Quintessence® (Potlatch Corp.) paper stock that had been previously laminated with Kodak APPROVAL® Prelaminate, CAT # 173 9671.

Color and density measurements were made using a Gretag SPM100-II portable spectrophotometer set for D$_{50}$ illuminant and 2 degree observer angle. Readings were made with black backing behind the samples. The CIELAB L* a* b* coordinates reported are interpolated to a status T density of 1.49.

In using CIELAB, colors can be expressed in terms of three parameters: L*, a* and b*, where L* is a lightness function, and a* and b* define a point in color space. Thus, a plot of a* vs. b* values for a color sample can be used to accurately show where that sample lies in color space, i.e., what its hue is. This allows different samples to be compared for hue if they have similar L* values.

The color differences between the samples can be expressed as ΔE, where ΔE is the vector difference in CIELAB color space between the laser thermal generated image and the orange ink color aim, according to the following formula:

$$\Delta E = \text{square root}[(L^*_e - L^*_s)^2 + (a^*_e - a^*_s)^2 + (b^*_e - b^*_s)^2]$$

wherein subscript e represents the measurements from the experimental material and subscript s represents the measurements from the orange ink color aim.

The color differences can also be expressed in terms of a hue angle and saturation C* according to the following formulas:

$$\text{Hue angle} = \arctan b^*/a^*$$

$$C^* = \text{square root}(a^{*2} + b^{*2})$$

The results are shown in the following table:

TABLE

| Orange Element | L* | a* | b* | ΔE | Hue angle | ΔHue angle | C* | ΔC* |
|---|---|---|---|---|---|---|---|---|
| Control | 68.2 | 53.2 | 80.9 | — | 56.7 | — | 96.9 | — |
| 1 | 68.5 | 52.4 | 82.4 | 1.7 | 57.5 | 0.8 | 97.6 | 0.7 |
| 2 | 68.4 | 52.8 | 81.1 | 0.5 | 56.9 | 0.2 | 96.8 | −0.1 |

The above results show that the orange dye-donor element of the invention provided a close match to the orange printing ink control.

The invention has been described in detail with particular reference to preferred embodiments thereof, but it will be understood that variations and modifications can be effected within the spirit and scope of the invention.

What is claimed is:

1. An orange dye-donor element for thermal dye transfer comprising a support having thereon a dye layer comprising a mixture of a pink dye and a first and second yellow dye dispersed in a polymeric binder, said pink dye having the formula A:

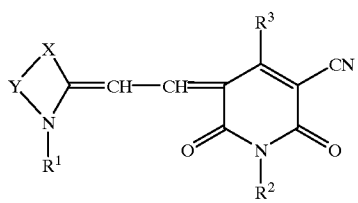

A wherein:
$R^1$, $R^2$ and $R^3$ each independently represents a substituted or unsubstituted alkyl group having from 1 to about 10 carbon atoms; a substituted or unsubstituted cycloalkyl group having from about 5 to about 7 carbon atoms; a substituted or unsubstituted allyl group; a substituted or unsubstituted aryl group of from about 6 to about 10 carbon atoms; or a substituted or unsubstituted hetaryl group of from about 5 to about 10 atoms;
X represents $C(CH_3)_2$, S, O or $NR_1$; and Y represents the atoms necessary to complete a 5- or 6-membered ring which may be fused to another ring system;
said first yellow dye having the formula E having the structure:

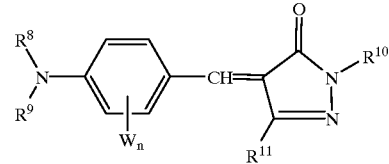

E wherein:
$R^8$, $R^9$ and $R^{10}$ each independently represents a substituted or unsubstituted alkyl group of from 1 to about 10 carbon atom; a cycloalkyl group of from about 5 to about 7 carbon atoms; or a substituted or unsubstituted aryl group of from about 6 to about 10 carbon atoms, such as phenyl, naphthyl, p-tolyl, m-chlorophenyl, p-methoxyphenyl, m-bromophenyl, o-tolyl, etc.;
or $R^8$ and $R^9$ can be joined together to form, along with the nitrogen to which they are attached, a 5-or 6-membered heterocyclic ring, such as a pyrrolidine or morpholine ring;
or either or both of $R^8$ and $R^9$ can be joined to the carbon atom of the benzene ring at a position ortho to the position of attachment of the anilino nitrogen to form a 5- or 6-membered ring, thus forming a polycyclic system such as 1,2,3,4-tetrahydroquinoline, julolidine, 2,3-dihydroindole, or benzomorpholine;
$R^{11}$ represents a substituted or unsubstituted alkoxy group having from1 to about 10 carbon atoms, such as methoxy, ethoxy, methoxyethoxy or 2-cyanoethoxy; a substituted or unsubstituted aryloxy group having from about 6 to about 10 carbon atoms, such as phenoxy, m-chlorophenoxy, or naphthoxy; $NHR^8$; $NR^8R^9$;
each W independently represents a substituted or unsubstituted alkyl group having from 1 to about 10 carbon atoms; alkoxy having from 1 to about 10 carbon atoms; halogen; or two adjacent W's together represent the atoms necessary to complete a 5- or 6-membered ring, thus forming a fused ring system; and
n represents an integer from 0 to 2;
said second yellow dye having the formula F or G, said formula F having the structure:

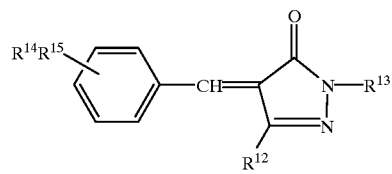

F wherein:
$R^{12}$ represents methyl or a substituted or unsubstituted alkoxy group having from 1 to about 10 carbon atoms; a substituted or unsubstituted aryloxy group having from about 6 to about 10 carbon atoms;
$R^{13}$ represents a substituted or unsubstituted alkyl group of from 1 to about 10 carbon atom; a cycloalkyl group of from about 5 to about 7 carbon atoms; or a substituted or unsubstituted aryl group of from about 6 to about 10 carbon atoms;

$R^{14}$ and $R^{15}$ each independently represents hydrogen or a substituted or unsubstituted alkyl or alkoxy group having from 1 to about 4 carbon atoms; and said formula G having the structure:

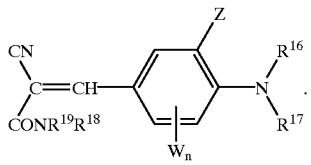

G wherein:

$R^{17}$, $R^{18}$ and $R^{19}$ each independently represents the same groups as $R^1$, $R^2$ and $R^3$ above;

$R^{16}$ represents any of the groups for $R^{17}$, $R^{18}$ and $R^{19}$ or represents the atoms which when taken together with Z forms a 5- or 6-membered ring;

Z represents hydrogen; a substituted or unsubstituted alkyl group having from 1 to about 10 carbon atoms; alkoxy; halogen; or represents the atoms which when taken together with $R^{16}$ forms a 5- or 6-membered ring;

each W independently represents a substituted or unsubstituted alkyl group having from 1 to about 10 carbon atoms; alkoxy having from 1 to about 10 carbon atoms; halogen; or two adjacent W's together represent the atoms necessary to complete a 5- or 6-membered ring, thus forming a fused ring system; and n represents an integer from 0 to 2.

2. The element of claim 1 wherein said dye-donor element contains an infrared-absorbing dye in said dye layer.

3. The element of claim 1 wherein in formula A, $R^1$ is butyl, $R^2$ is 2-methoxyethyl, $R^3$ is methyl, X represents $C(CH_3)_2$ and Y is a 6-membered aromatic ring.

4. The element of claim 1 wherein in formula E, $R^8$ and $R^9$ are each ethyl, $R^{10}$ is phenyl and $R^{11}$ is dimethylamino.

5. The element of claim 1 wherein in formula F, $R^{13}$ is phenyl, $R^{12}$ is methyl, $R^{14}$ is 3-methoxy and $R^{15}$ is 4-methoxy.

6. The element of claim 1 wherein in formula G, $R^{16}$ is benzyl, $R^{17}$ is ethyl, $R^{18}$ is hydrogen, $R^{19}$ is benzyl, Z is hydrogen and n is 0.

7. A process of forming an orange dye transfer image comprising imagewise-heating an orange dye-donor element comprising a support having thereon a dye layer comprising a mixture of dyes dispersed in a polymeric binder, and transferring a dye image to a dye-receiving element to form said orange dye transfer image, said orange dye-donor element comprising a support having thereon a dye layer comprising a mixture of a pink dye and at least one yellow dye dispersed in a polymeric binder, said pink dye having the formula A:

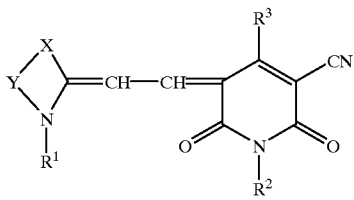

A wherein:

$R^1$, $R^2$ and $R^3$ each independently represents a substituted or unsubstituted alkyl group having from 1 to about 10 carbon atoms; a substituted or unsubstituted cycloalkyl group having from about 5 to about 7 carbon atoms; a substituted or unsubstituted allyl group; a substituted or unsubstituted aryl group of from about 6 to about 10 carbon atoms; or a substituted or unsubstituted hetaryl group of from about 5 to about 10 atoms;

X represents $C(CH_3)_2$, S, O or $NR_1$; and

Y represents the atoms necessary to complete a 5- or 6-membered ring which may be fused to another ring system;

said at least one yellow dye being chosen such that a solid area orange dye transfer image has a hue angle in CIELAB color space of from about 40 to about 70 degrees.

8. A process of forming a dye transfer image comprising imagewise-heating an orange dye-donor element comprising a support having thereon a dye layer comprising a mixture of dyes dispersed in a polymeric binder, and transferring a dye image to a dye-receiving element to form said dye transfer image, said orange dye-donor element comprising a support having thereon a dye layer comprising a mixture of a pink dye and a first and second yellow dye dispersed in a polymeric binder, said pink dye having the formula A:

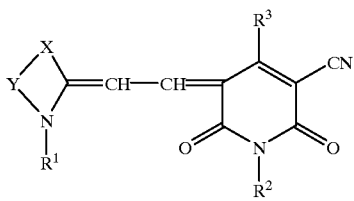

A wherein:

$R^1$, $R^2$ and $R^3$ each independently represents a substituted or unsubstituted alkyl group having from 1 to about 10 carbon atoms; a substituted or unsubstituted cycloalkyl group having from about 5 to about 7 carbon atoms; a substituted or unsubstituted allyl group; a substituted or unsubstituted aryl group of from about 6 to about 10 carbon atoms; or a substituted or unsubstituted hetaryl group of from about 5 to about 10 atoms;

X represents $C(CH_3)_2$, S, O or $NR_1$; and

Y represents the atoms necessary to complete a 5- or 6-membered ring which may be fused to another ring system;

said first yellow dye having the formula E having the structure:

E

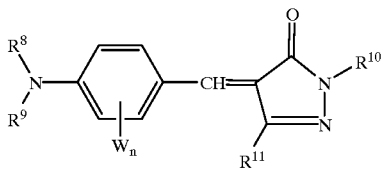

wherein:
- $R^8$, $R^9$ and $R^{10}$ each independently represents a substituted or unsubstituted alkyl group of from 1 to about 10 carbon atom; a cycloalkyl group of from about 5 to about 7 carbon atoms; or a substituted or unsubstituted aryl group of from about 6 to about 10 carbon atoms, such as phenyl, naphthyl, p-tolyl, m-chlorophenyl, p-methoxyphenyl, m-bromophenyl, o-tolyl, etc.;
- or $R^8$ and $R^9$ can be joined together to form, along with the nitrogen to which they are attached, a 5- or 6-membered heterocyclic ring, such as a pyrrolidine or morpholine ring;
- or either or both of $R^8$ and $R^9$ can be joined to the carbon atom of the benzene ring at a position ortho to the position of attachment of the anilino nitrogen to form a 5- or 6-membered ring, thus forming a polycyclic system such as 1,2,3,4-tetrahydroquinoline, julolidine, 2,3-dihydroindole, or benzomorpholine;
- $R^{11}$ represents a substituted or unsubstituted alkoxy group having from 1 to about 10 carbon atoms, such as methoxy, ethoxy, methoxyethoxy or 2-cyanoethoxy; a substituted or unsubstituted aryloxy group having from about 6 to about 10 carbon atoms, such as phenoxy, m-chlorophenoxy, or naphthoxy; $NHR^8$; $NR^8R^9$;
- each W independently represents a substituted or unsubstituted alkyl group having from 1 to about 10 carbon atoms; alkoxy having from 1 to about 10 carbon atoms; halogen; or two adjacent W's together represent the atoms necessary to complete a 5- or 6-membered ring, thus forming a fused ring system; and
- n represents an integer from 0 to 2;

said second yellow dye having the formula F or G, said formula F having the structure:

F

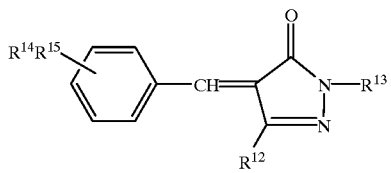

wherein:
- $R^{12}$ represents methyl or a substituted or unsubstituted alkoxy group having from 1 to about 10 carbon atoms; a substituted or unsubstituted aryloxy group having from about 6 to about 10 carbon atoms;
- $R^{13}$ represents a substituted or unsubstituted alkyl group of from 1 to about 10 carbon atom; a cycloalkyl group of from about 5 to about 7 carbon atoms; or a substituted or unsubstituted aryl group of from about 6 to about 10 carbon atoms;
- $R^{14}$ and $R^{15}$ each independently represents hydrogen or a substituted or unsubstituted alkyl or alkoxy group having from 1 to about 4 carbon atoms; and said formula G having the structure:

G

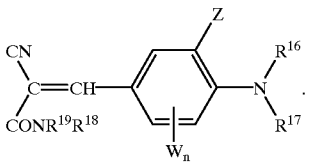

wherein:
- $R^{17}$, $R^{18}$ and $R^{19}$ each independently represents the same groups as $R^1$, $R^2$ and $R^3$ above;
- $R^{16}$ represents any of the groups for $R^{17}$, $R^{18}$ and $R^{19}$ or represents the atoms which when taken together with Z forms a 5- or 6-membered ring;
- Z represents hydrogen; a substituted or unsubstituted alkyl group having from 1 to about 10 carbon atoms; alkoxy; halogen; or represents the atoms which when taken together with $R^{16}$ forms a 5- or 6-membered ring;
- each W independently represents a substituted or unsubstituted alkyl group having from 1 to about 10 carbon atoms; alkoxy having from 1 to about 10 carbon atoms; halogen; or two adjacent W's together represent the atoms necessary to complete a 5- or 6-membered ring, thus forming a fused ring system; and
- n represents an integer from 0 to 2.

9. The process of claim 8 wherein said dye-donor element contains an infrared-absorbing dye in said dye layer.

10. The process of claim 8 wherein in formula A, $R^1$ is butyl, $R^2$ is 2-methoxyethyl, $R^3$ is methyl, X represents $C(CH_3)_2$ and Y is a 6-membered aromatic ring.

11. The process of claim 8 wherein in formula E, $R^8$ and $R^9$ are each ethyl, $R^{10}$ is phenyl and $R^{11}$ is dimethylamino.

12. The process of claim 8 wherein in formula F, $R^{13}$ is phenyl, $R^{12}$ is methyl, $R^{14}$ is 3-methoxy and $R^{15}$ is 4-methoxy.

13. The process of claim 8 wherein in formula G, $R^{16}$ is benzyl, $R^{17}$ is ethyl, $R^{18}$ is hydrogen, $R^{19}$ is benzyl, Z is hydrogen and n is 0.

14. A thermal dye transfer assemblage comprising:
a) an orange dye-donor element comprising a support having thereon a dye layer comprising a mixture of dyes dispersed in a polymeric binder, and
b) a dye-receiving element comprising a support having thereon a dye image-receiving layer, said dye-receiving element being in a superposed relationship with said orange dye-donor element so that said dye layer is in contact with said dye image-receiving layer, said orange dye-donor element comprising a support having thereon a dye layer comprising a mixture of a pink dye and a first and second yellow dye dispersed in a polymeric binder, said pink dye having the formula A:

A

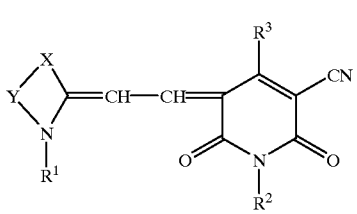

wherein:

$R^1$, $R^2$ and $R^3$ each independently represents a substituted or unsubstituted alkyl group having from 1 to about 10 carbon atoms; a substituted or unsubstituted cycloalkyl group having from about 5 to about 7 carbon atoms; a substituted or unsubstituted allyl group; a substituted or unsubstituted aryl group of from about 6 to about 10 carbon atoms; or a substituted or unsubstituted hetaryl group of from about 5 to about 10 atoms;

X represents $C(CH_3)_2$, S, O or $NR_1$; and

Y represents the atoms necessary to complete a 5- or 6-membered ring which may be fused to another ring system;

said first yellow dye having the formula E having the structure:

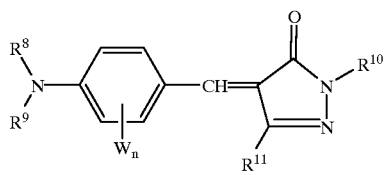

E wherein:

$R^8$, $R^9$ and $R^{10}$ each independently represents a substituted or unsubstituted alkyl group of from 1 to about 10 carbon atom; a cycloalkyl group of from about 5 to about 7 carbon atoms; or a substituted or unsubstituted aryl group of from about 6 to about 10 carbon atoms, such as phenyl, naphthyl, p-tolyl, m-chlorophenyl, p-methoxyphenyl, m-bromophenyl, o-tolyl, etc.;

or $R^8$ and $R^9$ can be joined together to form, along with the nitrogen to which they are attached, a 5-or 6-membered heterocyclic ring, such as a pyrrolidine or morpholine ring;

or either or both of $R^8$ and $R^9$ can be joined to the carbon atom of the benzene ring at a position ortho to the position of attachment of the anilino nitrogen to form a 5- or 6-membered ring, thus forming a polycyclic system such as 1,2,3,4-tetrahydroquinoline, julolidine, 2,3-dihydroindole, or benzomorpholine;

$R^{11}$ represents a substituted or unsubstituted alkoxy group having from 1 to about 10 carbon atoms, such as methoxy, ethoxy, methoxyethoxy or 2-cyanoethoxy; a substituted or unsubstituted aryloxy group having from about 6 to about 10 carbon atoms, such as phenoxy, m-chlorophenoxy, or naphthoxy; $NHR^8$; $NR^8R^9$;

each W independently represents a substituted or unsubstituted alkyl group having from 1 to about 10 carbon atoms; alkoxy having from 1 to about 10 carbon atoms; halogen; or two adjacent W's together represent the atoms necessary to complete a 5- or 6-membered ring, thus forming a fused ring system; and n represents an integer from 0 to 2;

said second yellow dye having the formula F or G, said formula F having the structure:

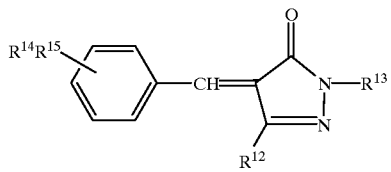

F wherein:

$R^{12}$ represents methyl or a substituted or unsubstituted alkoxy group having from 1 to about 10 carbon atoms; a substituted or unsubstituted aryloxy group having from about 6 to about 10 carbon atoms;

$R^{13}$ represents a substituted or unsubstituted alkyl group of from 1 to about 10 carbon atom; a cycloalkyl group of from about 5 to about 7 carbon atoms; or a substituted or unsubstituted aryl group of from about 6 to about 10 carbon atoms;

$R^{14}$ and $R^{15}$ each independently represents hydrogen or a substituted or unsubstituted alkyl or alkoxy group having from 1 to about 4 carbon atoms; and said formula G having the structure:

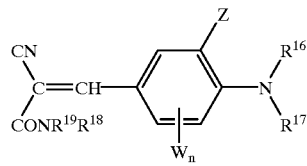

G wherein:

$R^{17}$, $R^{18}$ and $R^{19}$ each independently represents the same groups as $R^1$, $R^2$ and $R^3$ above;

$R^{16}$ represents any of the groups for $R^{17}$, $R^{18}$ and $R^{19}$ or represents the atoms which when taken together with Z forms a 5- or 6-membered ring;

Z represents hydrogen; a substituted or unsubstituted alkyl group having from 1 to about 10 carbon atoms; alkoxy; halogen; or represents the atoms which when taken together with $R^{16}$ forms a 5- or 6-membered ring;

each W independently represents a substituted or unsubstituted alkyl group having from 1 to about 10 carbon atoms; alkoxy having from 1 to about 10 carbon atoms; halogen; or two adjacent W's together represent the atoms necessary to complete a 5- or 6-membered ring, thus forming a fused ring system; and n represents an integer from 0 to 2.

15. The assemblage of claim 14 wherein said dye-donor element contains an infrared-absorbing dye in said dye layer.

16. The assemblage of claim 14 wherein in formula A, $R^1$ is butyl, $R^2$ is 2-methoxyethyl, $R^3$ is methyl, X represents $C(CH_3)_2$ and Y is a 6-membered aromatic ring.

17. The assemblage of claim 14 wherein in formula E, $R^8$ and $R^9$ are each ethyl, $R^{10}$ is phenyl and $R^{11}$ is dimethylamino.

18. The assemblage of claim 14 wherein in formula F, $R^{13}$ is phenyl, $R^{12}$ is methyl, $R^{14}$ is 3-methoxy and $R^{15}$ is 4-methoxy.

19. The assemblage of claim 14 wherein in formula G, $R^{16}$ is benzyl, $R^{17}$ is ethyl, $R^{18}$ is hydrogen, $R^{19}$ is benzyl, Z is hydrogen and n is 0.

* * * * *